(12) United States Patent
Bhat

(10) Patent No.: US 6,623,127 B2
(45) Date of Patent: Sep. 23, 2003

(54) SYSTEM AND METHOD FOR ENLARGING A LIQUID CRYSTAL DISPLAY SCREEN OF A PERSONAL DATA ASSISTANT

(75) Inventor: Rashmi Bhat, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/730,418

(22) Filed: Dec. 4, 2000

(65) Prior Publication Data
US 2002/0067471 A1 Jun. 6, 2002

(51) Int. Cl.⁷ .................. G03B 21/08; G03B 21/06; G03B 21/22; G02B 27/02; G02B 27/00
(52) U.S. Cl. ............... 353/65; 353/63; 353/67; 359/803; 359/804; 359/809
(58) Field of Search ............... 353/63, 65, 67; 359/802, 803, 804, 806, 807, 809; 348/835, 834, 777

(56) References Cited

U.S. PATENT DOCUMENTS

| | | | | |
|---|---|---|---|---|
| 4,051,535 A | * | 9/1977 | Inglis | 348/785 |
| 5,574,477 A | * | 11/1996 | Shimizu et al. | 345/102 |
| 5,768,095 A | * | 6/1998 | Nakamura et al. | 361/681 |
| 6,371,616 B1 | * | 4/2002 | Doany et al. | 353/39 |

* cited by examiner

Primary Examiner—Russell Adams
Assistant Examiner—Magda Cruz
(74) Attorney, Agent, or Firm—Thomas E. Tyson; Edmond A. DeFrank

(57) ABSTRACT

The present invention is embodied in a system and method for projecting a liquid crystal display (LCD) of a personal data assistant or mobile telephone. In general, the present invention enables users of PDAs and/or mobile telephones to enlarge the view of textual and graphical images. Namely, the present invention is embodied in a system and method that projects the LCD display screen of LCD displaying devices, such as PDAs and/or mobile telephones, onto a larger surface, for example, the back of car or airplane seat. This allows Internet information, including World Wide Web (WWW) pages or online demos with text and images to be enlarged. Also, enlargement of text and images by the projection arrangement of the present invention allows easier reading for people that have difficulty seeing small text/numerical characters and images.

22 Claims, 2 Drawing Sheets

SYSTEM AND METHOD FOR ENLARGING A LIQUID CRYSTAL DISPLAY SCREEN OF A PERSONAL DATA ASSISTANT

BACKGROUND OF THE INVENTION

1. Field of the Invention

The present invention relates in general to mobile telephones and personal data assistants and in particular to a system and method for projecting a liquid crystal display (LCD) of a personal data assistant or mobile telephone.

2. Related Art

Electronic devices are becoming more and more ubiquitous because they help users manage their busy schedules, as well as communicate with the world. For example, personal data assistants (PDAs) and mobile telephones are becoming a necessity for many. A PDA is a handheld device that allows users to access information, keep track of their busy schedules, and communicate with others. A typical PDA can function as a mobile or cellular phone, fax sender, and personal organizer. Recently, many of the major announcements revolve around wireless connectivity for a PDA. It is very important for today's mobile professional to able to access information from anywhere in the world.

PDAs are very popular because they are designed to be portable and small. Currently, PDA manufactures strive to make PDAs as potable and small as possible. Fitting easily into a wallet, small purse, or shirt pocket, the newest PDAs can travel anywhere in the world. People do not think twice about taking them anywhere. The new micro-sized PDAs come equipped with the features users value most, including a calendar, address book and Web clipping capabilities to view stock quotes, weather forecast and the latest news.

However, although there are many advantages to having a micro-sized PDA, the new smaller PDAs also have smaller screens, which can be difficult to read for many people. Mobile professionals are receiving an increasing amount of e-mails and information on their PDAs. Large amount of information packed and cluttered onto a tiny screen can cause eyestrain and headaches. In addition, cluttered information represented on a small screen can be difficult to read, which can cause a user to overlook important information, such as appointments, messages, reports, etc.

Therefore, what is needed is a system and method to enlarge the information contained on the PDA's screen and make the text easier to read. The system would be able to project and enlarge the text from a micro-sized PDA screen onto a flat surface (i.e. a wall). What is further needed is a system and method that allows users easily read information contained on a LCD screen. This would alleviate the eyestrain associated with reading information on a small screen and can enhance comprehension.

SUMMARY OF THE INVENTION

To overcome the limitations in the prior art described above, and to overcome other limitations that will become apparent upon reading and understanding the present specification, the present invention is embodied in a system and method for projecting a liquid crystal display (LCD) of a personal data assistant (PDA) or mobile telephone.

In general, the present invention enables users of PDAs and/or mobile telephones to enlarge the view of textual and graphical images. Namely, the present invention is embodied in a system and method that projects the LCD display screen of LCD displaying devices, such as PDAs and/or mobile telephones, onto a larger surface, for example, the back of car or airplane seat.

This allows the graphical user interface (GUI) of the LCD screen to present Internet information, including World Wide Web (WWW) pages or online demos with text and images as enlarged views. Also, Enlargement of the LCD's GUI by the projection arrangement of the present invention allows easier reading for people that have difficulty seeing small text/numerical characters and images.

In particular, the present invention includes a removable adapter that is coupled to a LCD screen of any suitable device, such as a PDA or mobile phone. The adapter includes a projection device and a light source. Since LCDs are supported on a transparent substrate, light from the light source of the projector can be transmitted through the display to create an enlarged image of the text and images in the display that are made opaque by proper excitation of the LCD.

In one embodiment, the display portion of the adapter can be twisted around in a manner to project the GUI of the LCD onto a display surface while functional input areas, such as the keypad and the scroll buttons of the LCD displaying device remain in an upright position. The adapter can be manipulated by the user of the LCD displaying device while simultaneously affording an enlarged view of the LCD.

The present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized arid structural changes may be made without departing from the scope of the present invention.

I. General Overview of the Components

Figure 1:
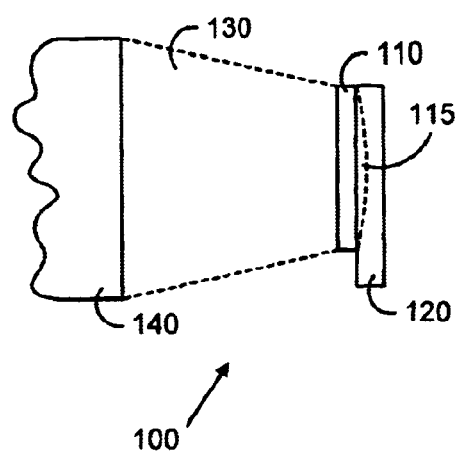
FIG. 1 is a general pictorial block diagram showing an overview of the present invention.

FIG. 1 is a general pictorial block diagram showing an overview of the present invention. In general, the system 100 of the present invention enables users of LCD displaying devices, such as PDAs and/or mobile telephones, to enlarge the view of textual and graphical images. Namely, the system projects a liquid crystal display (LCD) of a personal data assistant (PDA) or mobile telephone onto a larger surface.

Specifically, the system 100 of the present invention includes a removable adapter 110 that is coupled to a LCD screen 115 of any suitable device 120, such as a PDA or mobile phone. The LCD display screen 115 of the LCD displaying device 120 is projected by lights 130 onto a surface 140 that is large and relatively flat, for example, the back of car or airplane seat. This allows the graphical user interface (GUI) of the LCD screen 115 to present Internet information, including World Wide Web (WWW) pages or online demos with text and images as enlarged views.

II. Details of the Components and Operation

Figure 2:
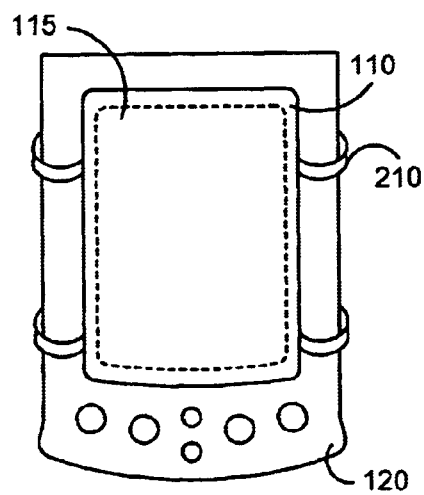
FIG. 2 is a diagram showing the projector of the present invention.

FIG. 2 is a diagram showing the projector of the present invention. The adapter 110 can reside over the LCD display as a "snap-on" device. Namely, snap to fit resilient members 210 can be used at each corner of the adapter 110 to allow the adapter 110 to be easily and quickly added or removed from the LCD displaying device 120. Also, the adapter 110 can be adjustable in size so that it universally fits all or most LCD displays.

Figure 3:
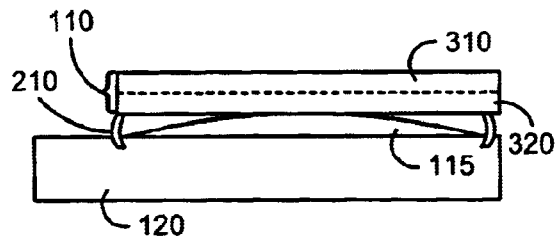
FIG. 3 is a detailed side view illustrating a working example projector of the present invention.

FIG. 3 is a detailed side view illustrating a working example projector of the present invention. The adapter 110 includes a projection device 310, such as a suitable lens and a light source 320. The projection device can be used to magnify and project the GUI of the LCD onto a larger surface. Since LCDs are supported on a transparent substrate, light from the light source of the projector 110 can be transmitted through the display to create an enlarged image of the text and images in the display that are made opaque by proper excitation of the LCD.

Figure 4:
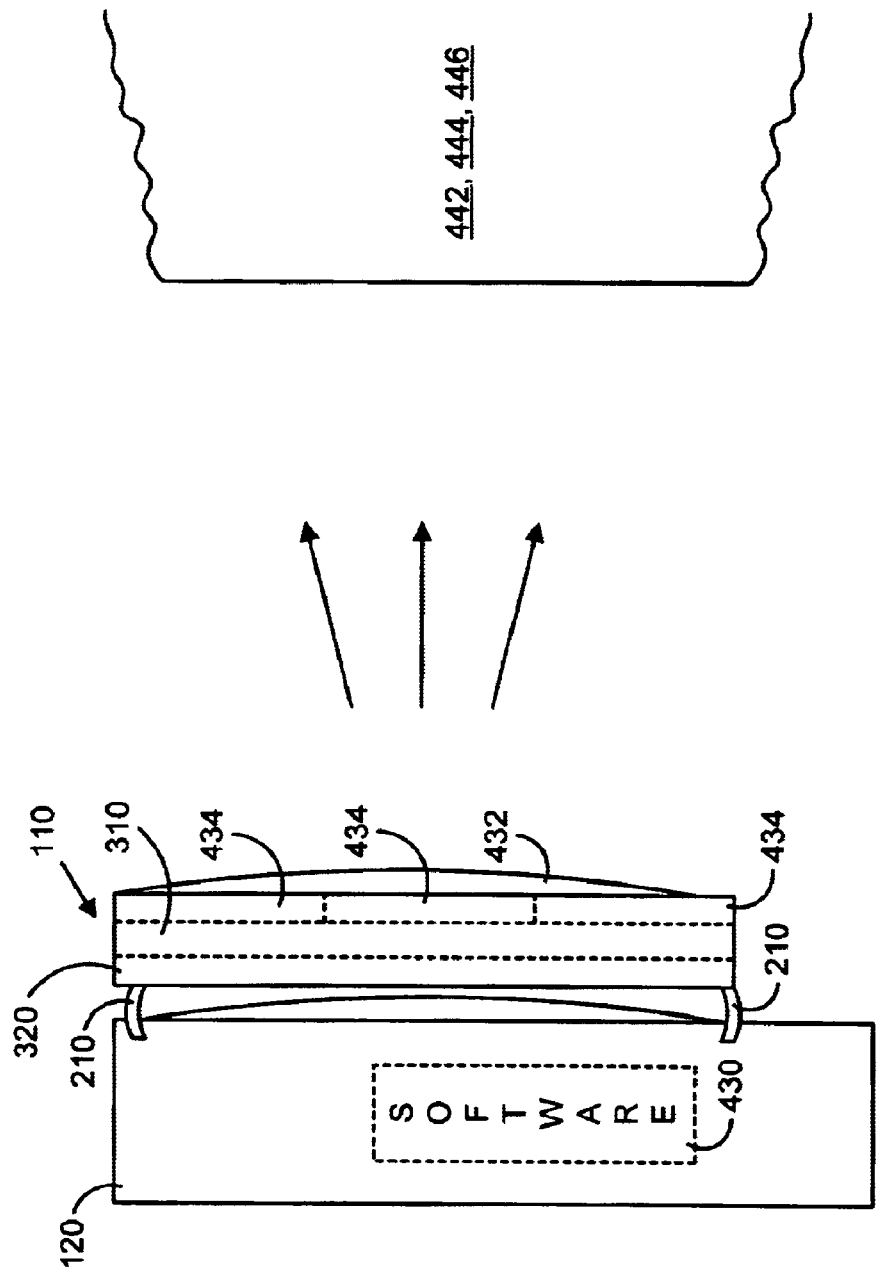
FIG. 4 is a general block diagram showing a working example of the present invention.

Referring to FIG. 4, in addition, the LCD displaying device 120 can have software 430 for controlling the magnification level and for optimizing the projection to make it clear and readable. Also, additional magnification lenses 432 can be used for different types of displaying surfaces 140. Next, additional or other light sources 434 or different color light sources can be used to appropriately illuminate the display on different surfaces that different light intensity or on different colors surfaces. Further, the light source can be self-powered or powered by the PDA or mobile phone.

Whether checking e-mail, or doing a small presentation, settings can be modified to project the images of a cell phone's 440 LCD GUI onto any suitable display area, such as a wall 442 or wall screen or a back of an automobile seat 444 or airplane seat 446. Due to this larger viewing area, more information can be downloaded and viewed, thus eliminating inconvenience of reading a long "list" of truncated words, which typically happens with small displays of handheld devices.

Also, images can be seen with greater clarity. This would be useful while using graphical software (e.g. system management software), or viewing WWW web pages from the mobile phone. The LCD is supported on a transparent substrate so that light from a provided light source can be transmitted through the display to create an enlarged image of the numerals in the display that are made opaque by proper excitation of the LCD.

In one embodiment, referring back to FIGS. 1 and 2 along with FIG. 3, a display portion of the adapter 110 can be twisted around in a manner to project the GUI of the LCD 115 onto a display surface 140 while functional input areas, such as the keypad and the scroll buttons 220 of the LCD displaying device 120 remain in an upright position. The adapter 110 can be manipulated by the user of the LCD displaying device 120 while simultaneously affording an enlarged view of the LCD 115.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A projection system for enlarging the graphical user interface of a liquid crystal displaying device of a personal data assistant, comprising:

an adapter that is removeably connected to the liquid crystal displaying device of the personal data assistant and including an internal projector integrated with the adapter for magnifying the graphical user interface onto a display area, wherein the adapter includes snap-on device with snap to fit resilient members at each corner of the adapter.

2. The projection system of claim 1, further comprising a light source coupled to the projector for transmitting light through the liquid crystal display.

3. The projection system of claim 2, wherein the light source enlarges the information contained on the liquid crystal display with opacity by excitation of the liquid crystal display.

4. The projection system of claim 2, wherein the liquid crystal displaying device is supported on a transparent substrate so that light from the light source is transmitted through the display.

5. The projection system of claim 1, wherein the adapter is adjustable in size so that it universally fits standard size personal data assistants.

6. The projection system of claim 1, wherein the personal data assistant is a mobile telephone.

7. The projection system of claim 1, wherein the suitable display area is at least one of a wall, a back of an automobile seat or the back of an airplane seat.

8. The projection system of claim 1, wherein the adapter is capable of being twisted around in a manner to project the graphical user interface of the liquid crystal displaying device onto a display surface while functional input areas of the personal data assistant remain in an upright position.

9. A method for enlarging the graphical user interface of a liquid crystal displaying device a personal data assistant, comprising:

removeably connecting an adapter with an integrated projector to the liquid crystal displaying device of the personal data assistant;

magnifying the graphical user interface contained on the liquid crystal displaying device onto a display area with the projector, wherein plural interchangeable magnification lenses are respectively used for different types of displaying areas; and transmitting light through the liquid crystal display with the projector.

10. The method of claim 9, wherein the light source enlarges the information contained on the liquid crystal display with opacity by excitation of the liquid crystal display.

11. The method of claim 9, further comprising providing resilient connectivity of the adapter to the liquid crystal displaying device.

12. The method system of claim 9, wherein the adapter is adjustable in size so that it universally fits standard size personal data assistants.

13. The method of claim 9, wherein the liquid crystal displaying device is supported on a transparent substrate so that light from the light source is transmitted through the display.

14. A projector for enlarging the graphical user interface of a liquid crystal displaying device a personal data assistant, comprising:

an adapter that is removeably connected to the liquid crystal displaying device of the personal data assistant;

plural interchangeable magnification lenses connectable to the adapter of displaying areas;

a light source integrated with the projector for transmitting light through the liquid crystal display; and wherein the light source enlarges the information contained on the liquid crystal display with opacity by excitation of the liquid crystal display.

15. The projector of claim 14, wherein the adapter is capable of being twisted around in a manner to project the graphical user interface onto a display surface while functional input areas of the personal data assistant remain in an upright position.

16. The projector of claim 14, wherein projector resiliently attaches to the personal data assistant to allow the projector to be easily and quickly added or removed from the liquid crystal displaying device.

17. The projector of claim 14, wherein the projector is capable of being twisted around in a manner to project the graphical user interface of the liquid crystal displaying device onto a display surface while functional input areas of the personal data assistant remain in an upright position.

18. The projector of claim 17, wherein the display surface is at least one of a wall, a back of an automobile seat or the back of an airplane seat.

19. A projection system, comprising:

a personal data assistant having a liquid crystal displaying device for displaying a graphical user interface;

an adapter having an integrated projector that magnifies the graphical user interface onto, a display area, wherein the adapter is removeably connected to the liquid crystal displaying device and wherein the projector includes plural interchangeable magnification lenses.

20. The projection system of claim 19, wherein the adapter is capable of being twisted around in a manner to project the graphical user interface of the liquid crystal displaying device onto the display areas while functional input areas of the personal data assistant remain in an upright position.

21. The projection system of claim 19, wherein the projector includes plural interchangeable magnification lenses that are respectively used for different types of displaying areas.

22. The projection system of claim 19, wherein the adapter includes plural interchangeable light sources that appropriately illuminate the graphical user interface on different displaying areas with different colors surfaces.

* * * * *